United States Patent [19]
Trichot

[11] 3,906,088
[45] Sept. 16, 1975

[54] PHARMACEUTICAL TABLETS COATED WITH VINYL TERPOLYMERS

[75] Inventor: Michel Trichot, Maisons-Alfort, France

[73] Assignee: Societe des Produits Chimigues de la Montagne Noire, Paris, France

[22] Filed: Dec. 26, 1973

[21] Appl. No.: 427,560

[30] Foreign Application Priority Data
Dec. 26, 1972 France .............................. 72.46195

[52] U.S. Cl. ...................... 424/33; 424/32; 427/3; 428/407
[51] Int. Cl.² ......................................... A61K 9/32
[58] Field of Search..... 117/100 A, 161 UT; 424/32, 424/33; 260/78.5 B, 78.5 E, 78.5 UA; 427/3; 428/407

[56] References Cited
UNITED STATES PATENTS

| | | | |
|---|---|---|---|
| 3,275,589 | 9/1966 | Alexander et al. | 260/78.5 E |
| 3,674,624 | 7/1972 | Oberst et al. | 260/78.5 E |
| 3,674,625 | 7/1972 | Oberst et al. | 260/78.5 E |

FOREIGN PATENTS OR APPLICATIONS

| | | | |
|---|---|---|---|
| 44-11916 | 5/1969 | Japan | 424/32 |
| 45-2033 | 1/1970 | Japan | 424/32 |
| 37-12293 | 8/1962 | Japan | 424/33 |
| 45-12756 | 5/1970 | Japan | 424/32 |
| 1,356,034 | 6/1974 | United Kingdom | |

*Primary Examiner*—Michael Sofocleous
*Assistant Examiner*—Dennis C. Konopacki
*Attorney, Agent, or Firm*—Millen, Raptes & White

[57] ABSTRACT

Coated pharmaceutical tablets are obtained by coating a core with a polymeric substance, wherein there is deposited on the core a solution containing a ternary copolymer comprising from 60 to 87% by weight of units coming from vinyl acetate, from 3 to 30% by weight of units coming from crotonic acid and from 10 to 37% by weight of units coming from a maleic ester, and the product thus obtained is dried.

6 Claims, No Drawings

PHARMACEUTICAL TABLETS COATED WITH VINYL TERPOLYMERS

The present invention relates to a new process of coating tablets for pharmaceutical use and to the products thus obtained.

The use of coated tablets is more and more widespread in the pharmaceutical industry; the various layers of coating used are generally based on talc, sugar and/or natural adhesive plastic substances.

Furthermore, for making this coating, it has been recommended to use copolymers of vinyl acetate and crotonic acid; however, such binary copolymers present certain disadvantages concerning in particular the homogeneity of the polymer film on the tablet and the adherence of said film on the substrate.

The present invention relates to a process which makes it possible to overcome these difficulties; the new coating layers enable, in addition, the regulation of the disintegration of the film, and the tablet in the digestive passage.

The invention is characterized in that, for coating the tablets, a ternary copolymer of vinyl acetate, crotonic acid and maleic ester is used. The relative proportions of the three constituents are from 60 to 87 % by weight of units coming from vinyl acetate, from 3 to 30% by weight of units coming from crotonic acid and from 10 to 37 % by weight of units coming from maleic ester (this latter preferably being di-ethyl-hexyl maleate). Such ternary copolymers are known per se and described for example in French Pat. No. 2,098,892.

The copolymers used contain carboxylic functions which may be totally or partially salified by the action of alkaline hydroxide, ammonia, amines and, preferably, aminoalcohols, mono-, di- and tri-ethanol or propanol amino, 2-amino 2-methyl-3-propane-diol, 2-amino 3-ethyl 1,3-propane-diol, tris-(hydroxymethyl)-amino methane, 2-amino 2-methyl-3-pentanol, etc., this list of amino-alcohols not being limiting. An aqueous solution of these polymers is thus obtained.

The copolymers are film-forming, their solutions in organic solvents or in aqueous medium leave, after the solvent has evaporated, a continuous, hard film, which may be rendered supple by the addition of plasticizers, such as glycerine, phthalic esters, butyl acetate ricinoleate, esters of sorbitan (SPAN 80 - sorbitan monostearate), the product of condensation of ethylene oxide on a polypropylene glycol (EMKALYX L 101), etc.

The copolymers which may be used according to the invention are not toxic as may have been shown by tests directed on the acute toxicity by the oral route and on the ocular and cutaneous irritating power.

The process used for coating may, for example, be the known process briefly described as follows:

The core containing the active substance is placed in a turbine whose speed of rotation is suitably regulated, a solution of the coating material is acted upon for a certain length of time in said turbine, then a current of hot air is blown therein to evaporate the solvent completely.

This process, in accordance with U.S. terminology, is descriptive of the employment of a conventional coating pan, the rotation of the pan leading to the consumption of the coating solution and the formation of coated tablets. See for example, Remington's Practice of Pharmacy, Martin and Cook, 1956, Eleventh edition, The Mack Publishing Co., Easton, Pa., pages 400-402.

It is possible, according to the invention, to modify the properties of the copolymers by adding to their solution a plasticizer, known per se, such as for example ethyl phthalate, butyl ricinoleate, oxyethylene compounds, propylene glycols, sorbitan esters.

It is also possible to add to said solution either a dyestuff or an active pharmaceutical ingredient; in this latter case, the coating layer will therefore also be active as medicament, this activity possibly being identical, different or complementary to that of the core of the coated tablet.

The coated tablets obtained were tested for their disintegrating properties; these tests are made by plunging said tablets into water at 37°C or in an artificial gastric juice made according to the French Codex or according to U.S. standard USP.

The following non-limiting examples illustrate the invention.

EXAMPLES 1 to 5

A core was made by compressing the following mixture:

| | | |
|---|---|---|
| Lactose | 315 | mg |
| Maize starch | 99 | mg |
| Gum arabic | 22.5 | mg |
| Talc | 9 | mg |
| Magnesium stearate | 4.5 | mg |
| Sodium chloride | 20 | mg |
| | 470 | mg per tablet |

These tablets have a diameter of 11 mm, a thickness of 5.4 mm, a radius of curvature of 9 mm and a hardness of 6 kg (ERMEKA durometer) and a weight of 470 mg.

Furthermore, a solution is made in a mixture of 50 % methanol and 50 % methylene chloride, by weight, of a copolymer containing 70 % by weight of units coming from vinyl acetate, 15 % by weight of units coming from crotonic acid and 15 % by weight of units coming from diethyl hexyl maleate. The solution (5 % by weight of the terpolymer), also containing 1 % of a known plasticizer, is employed to coat the core so as to form a coating which represents about 5 % by weight with respect to the core.

The tablets obtained are then tested, as indicated hereinabove, to show the duration of their disintegration in the medium used. It will be noted that the time for disintegration in water, of the non-coated core is 10 minutes at 37°C. The results obtained are mentioned in Table I.

TABLE I

| Example and Plasticizer No. | water at 37°C | Disintegration time in Artificial Gastric juice 37°C Codex | Artificial Gastric juice 37°C USP |
|---|---|---|---|
| 1. glycerine | 0hr 50min | 2hr | 1hr 30min |
| 2. Ethyl phthalate | 0hr 40min | 1hr 35min | 2hr |
| 3. Butyl acetate ricinolate | 0hr 55min | 2hr | 1hr |
| 4. Emkalyx L101* | 1hr 50min | 1hr 20min | 1hr |
| 5. Span 80** | 0hr 0min | 1hr 10min | 1hr |

*Emkalyx L101 is sold in France by UGINE KUHLMAN, and is sold in the U.S.A. under the trademark PLURALIX by Wyandott Corp.
**Span 80 is sold by Atlas Chemical Industries.

It will be noted that the tablets according to the invention have a very homogeneous coating of the copolymer and that the adherence of this latter to the substrate is noteworthy.

What we claim is:

1. A coated pharmaceutical tablet comprising a tablet core containing an active pharmaceutical ingredient coated with a film of a ternary copolymer consisting essentially of from 60 to 87% by weight of units coming from vinyl acetate, from 3 to 30% by weight of units coming from crotonic acid and from 10 to 37% by weight of units coming from a maleic ester.

2. A coated tablet according to claim 1, wherein the units coming from a maleic ester are units from the copolymerization of diethyl-hexyl maleate.

3. A coated tablet according to claim 1, containing a plasticizer in the coating film.

4. A coated tablet according to claim 3, wherein said plasticizer is selected from the group consisting of glycerine, phthalic esters, butyl acetate ricinolate, esters of sorbitan, and reaction product of ethylene oxide on a polypropylene glycol.

5. A coated tablet according to claim 4, wherein the units coming from a maleic ester are units from the copolymerization of diethyl-hexyl maleate.

6. A coated tablet according to claim 4, the ternary copolymer and plasticizer being present in said coating film in a weight ratio of about 5:1 respectively.

* * * * *